Sept. 18, 1923.

W. I. TUTTLE 1,468,054

BEAM CONSTRUCTION

Filed March 20, 1922

Walter I. Tuttle Inventor

By his Attorneys
Emery, Varney, Blair & Hogue.

Patented Sept. 18, 1923.

1,468,054

UNITED STATES PATENT OFFICE.

WALTER I. TUTTLE, OF PROVIDENCE, RHODE ISLAND, ASSIGNOR TO FRANK MOSSBERG COMPANY, OF ATTLEBORO, MASSACHUSETTS, A CORPORATION OF RHODE ISLAND.

BEAM CONSTRUCTION.

Application filed March 20, 1922. Serial No. 545,049.

*To all whom it may concern:*

Be it known that I, WALTER I. TUTTLE, a citizen of the United States, and a resident of Providence, in the county of Providence and State of Rhode Island, have invented an Improvement in Beam Constructions, of which the following is a specification.

This invention relates to construction for warp beams and the like with particular reference to head construction in such devices.

One of the objects thereof is to provide a simple and practical construction of the above nature which is capable of a high degree of efficiency in action. Another object is to provide a construction of the above nature which embodies lightness and flexibility and which, at the same time, is amply strong and rigid to withstand the conditions of hardest practical use. Other objects will be in part obvious and in part pointed out hereinafter.

The invention accordingly consists in the features of construction, combinations of elements and arrangements of parts as exemplified in the structure to be hereinafter described and the scope of the application of which will be indicated in the following claims.

Figure 1:
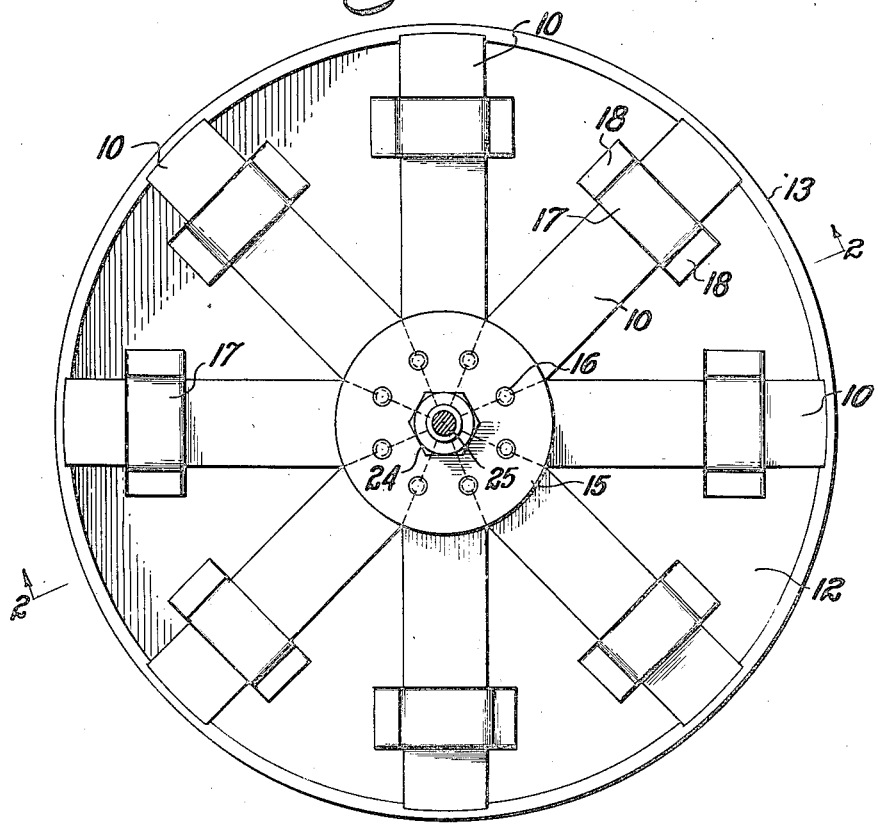
Figure 2:
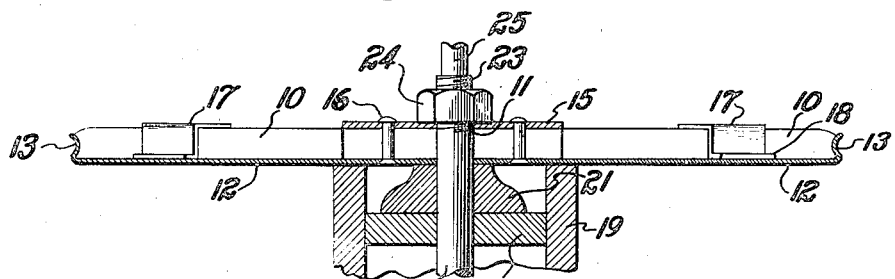

In the accompanying drawing, in which is shown one of the various possible embodiments of this invention, Figure 1 is an end elevation of a warp beam; and Figure 2 is a section along the line 2—2 of Fig. 1.

Similar reference characters refer to similar parts in both views of the drawings.

Referring now to the drawing in detail there is shown a built-up beam head, one of the elements of which is of wood and preferably comprises a plurality of wooden arms 10 radially extending from the center of the head substantially to its periphery. Arms 10 are preferably evenly spaced about the head and (as shown in dotted lines in Fig. 1) are tapered to interfit at their inner ends and form a substantially solid member about the center bore 11 of the head.

At the inner side of the head is a metallic head member 12 which preferably takes the form of a solid sheet metal disk provided with a bore at its center registering with the bore 11 formed at the center of the wooden member above described and extending outwardly therefrom substantially to the outer ends of radial arms 10. From this point member 12 is flanged and the flange extends inwardly toward the axis of the beam and then outwardly forming a groove 13 which extends about the periphery of the head and serves as a belt race through which the beam is driven. The outer ends of wooden arms 10 are preferably grooved to fit the contour of the flange and rest snugly against the inner surface of the same.

On the other side of the head is a metal disk or collar 15 resting against the central portions of the wooden arms 10. A plurality of rivets 16 connect disk 15 and member 12, passing through the wooden member, and when headed into position on the two metal members they securely and dependably clamp the same together with the wooden arms secured therebetween. Rivets 16 are preferably countersunk in member 12 in order that the inner side of the head may present a smooth, even surface.

Arms 10 are preferably further secured to member 12 at points adjacent their outer ends by means which preferably takes the form of a plurality of metal strips 17, one of which passes over each of arms 10 and is secured to the face of disk 12 as at 18 preferably by spot welding or by other suitable means.

It will be seen that as described above there is provided a beam head which is exceptionally light and thereby capable of a high degree of flexibility in operation. At the same time, however, the head is constructed in such a manner that the material is all used to the best advantage to produce a structure of great rigidity and strength.

The barrel member of the beam is shown at 19 and is preferably of a hollow wooden type built up of a number of sectors. Inside barrel 19 there is secured a wooden abutment 20, and between abutment 20 and the head is preferably placed a metal or wooden spacing block 21. A shaft 22 passes axially throughout the center of barrel 19 and through bore 11 of the head and is threaded as at 23 to receive a nut 24. Thus, as nut 24 is threaded into position the head is forced up into place against the end of barrel 10, member 12 contacting with the end of the barrel and with spacing block 21. Shaft 22 may be provided with a portion as 25 at its end which is adapted to rotate in suitable trunnions.

As many possible embodiments might be made of the above invention and as many changes might be made in the embodiment above set forth, it is to be understood that all matter hereinbefore set forth or shown in the accompanying drawing is to be interpreted as illustrative and not in a limiting sense.

I claim as my invention:

1. In construction for beam heads and the like, in combination, a circular metal disk, a plurality of wooden members resting against a face of said disk and extending radially from the center of the same substantially to its periphery, and means for securing together said metal disk and said radial wooden members.

2. In construction for beam heads and the like, in combination, a solid metal head member of a diameter substantially equal to that of the head, a head member comprising a plurality of radial wooden arms, and securing means for fastening said two head members together.

3. In construction for beam heads and the like, a beam head comprising a metal head member and a wooden head member each of substantially the diameter of the head and secured face to face, said wooden head member having spaced portions cut away to lessen the weight of the head.

4. In construction for beam heads and the like, a beam head comprising a plurality of wooden arms extending radially from the center of the head and metal connecting means secured to each of said arms and adapted to hold the same in said radial positions.

5. In construction for beam heads and the like, in combination, a wooden head member having a plurality of arms extending outwardly toward the periphery of the head, a metal head member resting against a face of said wooden head member and having a diameter substantially equal to that of the head, and securing means for fastening said two head members together.

6. In construction for beam heads and the like, in combination, a circular metal head member, a plurality of wooden members resting against a face of said metal head member and extending radially substantially from the center of the same to its periphery, clamping means at the center of the head for securing together said metal head member and said radial wooden members, and means adjacent the periphery of the head for securing together said metal head member and said radial wooden members.

7. In construction for beam heads and the like, in combination, a metal head member, a second metal head member spaced therefrom and having a diameter substantially equal to that of the head, and a plurality of radial wooden arms secured between said two metal head members and extending substantially from the center of the head to the periphery of said second mentioned metal head member.

8. In construction for beam heads and the like, in combination, a wooden head member comprising a plurality of radially extending arms, a solid metal head member resting against one side of said wooden head member and having a peripheral flange forming a belt race for the head, said flange being supported by the ends of said radial arms, and attaching means securing each of said radial arms to said metal head member.

9. In construction for beam heads and the like, in combination, a metal head member, a wooden head member resting against a face of said metal head member comprising a plurality of radial wooden arms extending from the center of said metal head member substantially to the periphery thereof, and a plurality of metal straps adapted to secure said radial arms to said metal head member.

10. In construction for beam heads and the like, in combination, a metal head member, a wooden head member resting against a face of said metal head member comprising a plurality of radial wooden arms extending from the center of said metal head member substantially to the periphery thereof, and a plurality of metal straps one fitting over each of said radial wooden arms adjacent its outer end, the ends of each of said metal straps resting upon the face of said metal head member and secured thereto.

11. In construction for beam heads and the like, in combination, a head member comprising a plurality of wooden members extending radially from the center of the head substantially to its periphery, a solid circular metal head member resting against one face of said wooden head member and having a flange extending over the outer ends of said radial arms to form a belt race, a circular metal head member of diameter smaller than that of said first mentioned metal head member resting against the other face of said wooden head member, a plurality of rivets passing through said three head members adapted to secure them together, and a plurality of metal straps one passing over each of said radial arms adjacent its outer end, the ends of each of said straps being spot welded to said first mentioned metal head member.

In testimony whereof, I have signed my name to this specification this 11th day of March, 1922.

WALTER I. TUTTLE.